United States Patent [19]

Derrick et al.

[11] 4,317,308
[45] Mar. 2, 1982

[54] METHOD AND APPARATUS FOR PLANT CULTIVATION

[75] Inventors: Bruce I. C. Derrick; Jack B. Geaslin, both of Hong Kong, Hong Kong

[73] Assignee: Agribusiness Enterprises Limited, Hong Kong, Hong Kong

[21] Appl. No.: 119,928

[22] Filed: Feb. 8, 1980

[51] Int. Cl.³ .................................................. A01G 1/04
[52] U.S. Cl. .................................................. 47/1.1; 47/65
[58] Field of Search ............................. 47/1.1, 65

[56] References Cited

U.S. PATENT DOCUMENTS

| 1,808,383 | 6/1931 | Steves ....................... 47/1.1 |
| 3,820,278 | 6/1974 | Giasante ..................... 47/1.1 |
| 4,109,395 | 8/1978 | Huang ....................... 47/65 X |

FOREIGN PATENT DOCUMENTS

| 305198 | 7/1920 | Fed. Rep. of Germany ......... 47/1.1 |
| 2846604 | 5/1979 | Fed. Rep. of Germany ......... 47/1.1 |
| 557633 | 1/1975 | Switzerland ................... 47/1.1 |
| 514506 | 11/1939 | United Kingdom . |
| 984404 | 2/1965 | United Kingdom . |
| 1041883 | 9/1966 | United Kingdom . |
| 1093292 | 11/1967 | United Kingdom . |
| 1110693 | 4/1968 | United Kingdom . |
| 1160512 | 8/1969 | United Kingdom . |
| 1302613 | 1/1973 | United Kingdom . |
| 1465257 | 2/1977 | United Kingdom . |
| 1472302 | 5/1977 | United Kingdom . |
| 1473172 | 5/1977 | United Kingdom . |
| 1494910 | 12/1977 | United Kingdom . |
| 1512606 | 6/1978 | United Kingdom . |

*Primary Examiner*—Robert E. Bagwill
*Attorney, Agent, or Firm*—Raphael Semmes

[57] ABSTRACT

Plant cultivation units include several tiers of cultivation beds in open baskets supported on trays extending between endless chains which couple a pair of drive pulleys to a pair of idler pulleys. The beds are driven about a generally vertical endless path at a speed sufficient to cause artifical air movement and to maintain a low air temperature differential between the top and bottom of the endless path; this permits greater vertical separation between the top and bottom of the path and greater growth area to floor area ratios. Hollow pulley shafts supply and withdraw air. A pair of pipes supply water and steam. A method of growing mushrooms includes two phases in a common housing: a pasteurization phase and a growth phase.

51 Claims, 14 Drawing Figures

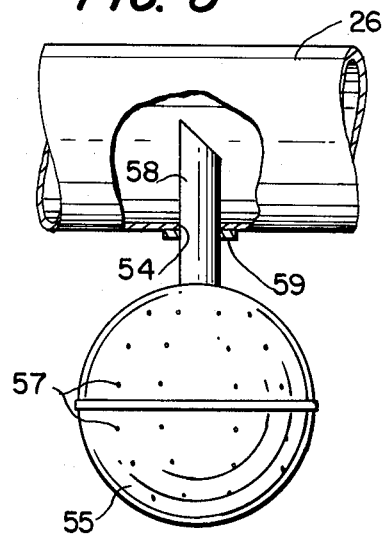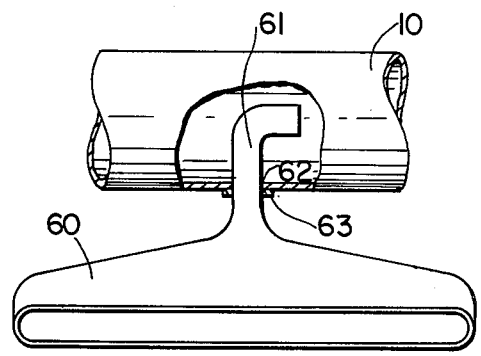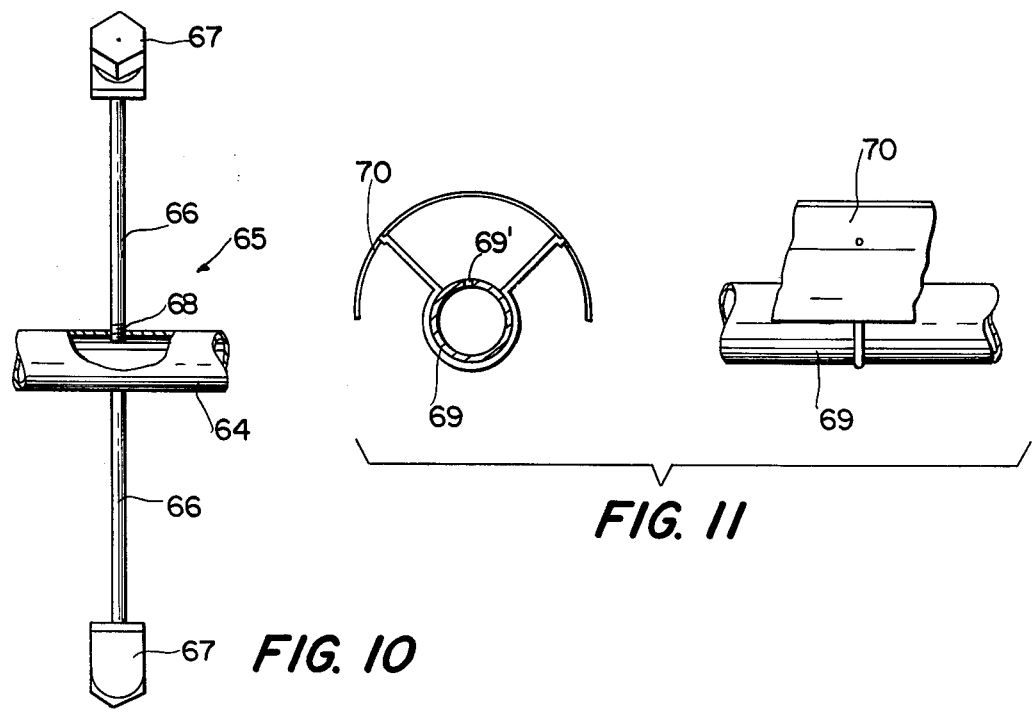

METHOD AND APPARATUS FOR PLANT CULTIVATION

BACKGROUND OF THE INVENTION

This invention relates to a method and apparatus for the cultivation of plants and, more particularly, plants such as edible mushrooms which require a closely controlled environment in which to propagate.

Mushrooms are very sensitive, requiring careful control of compost fermentation; sanitization of the beds, trays and utensils for fungus and pest control; exact temperatures for pasteurization and incubation of the spawn; and control of the temperature during the growing and harvesting period. Equally important are the regulation of humidity, filtration and circulation of the air, the supply of water, and the removal of carbon dioxide and other gases which are produced during the growing period.

Currently, there are two principal systems of commercial mushroom cultivation: the "shelf" system and the "tray" system. In the shelf system, the mushrooms are grown in a growth medium or compost placed in stationary beds on tiers of shelves in mushroom houses, abandoned mines or unused railway tunnels. Systems of this character require considerable physical and mechanical labor. In order partially to mechanize mushroom cultivation, many growers use the tray system (also referred to as the "two zone" system) requiring two and/or three separate rooms: one for pasteurizing the compost, one for growing the mushroom spores (spawn) in the filled trays, and another for growing the mushrooms. Unlike the immovable beds of compost in the shelf system, the tray system utilizes trays or frames of compost which can be moved from one area to another. This method of production can be used when a large, natural growing area is available, such as a mine or tunnel. Such areas are suitable for year-round growing but too expensive to heat for the necessary pasteurizing process; accordingly, separate small buildings must be constructed for pasteurizing and spawning. Mechanical means are used for moving the trays between the separate areas for each of the phases.

Although each grower has his own method, facilities, temperatures and time schedule, the following procedures are generally followed:

After composting, the beds or trays are filled either in the growing house itself for the shelf system or, if using the tray system, in a separate area. The beds or trays are then pasteurized to control harmful fungi, insects and nematodes. All ventilation is stopped; the temperature of the beds is allowed to rise to the required level and is maintained the required period of time to effect pasteurization. The room is then ventilated, and the temperature is dropped to the appropriate level for planting (spawning).

Once pasteurized, the beds or trays are "planted" with spawn either by hand or with a spawning machine. During the spawn run, correct humidity, ventilation and temperature must be maintained and the compost kept moist. Periodically, each bed or tray is checked for diseases or pests and watered. In some establishments, separate rooms are used for pasteurization and spawning. If trays are not removed to a separate spawning room, they frequently are restacked from the close pasteurization position to allow more room for necessary ventilation. This requires additional labor.

When cultivating the Agaricus variety mushroom, a 1" layer of top soil, peat, or other suitable material (casing soil), is spread on each bed at an appropriate time. The casing must be previously sterilized to kill any diseases by heating to 140° F.+ and the soil must be neutralized if acid. After casing, the trays are transported to the growing room. This step is not necessary for other varieties of mushrooms which do not require a casing soil.

Watering is required periodically until small mushrooms (pinheads) appear. After the mushrooms appear, the temperature is lowered to an appropriate temperature for the mushroom variety being cultivated. This improves growth and discourages diseases and insects. Proper humidity must be maintained at all times.

Once the growing period is completed, the spent compost is usually pasteurized for four hours to destroy pests and then removed. The growing room is then cleaned of all debris and readied for the next crop.

The prior art systems do not make efficient use of the volume of the enclosed growing room. Because optimum mushroom growth is obtained only within a narrow range of air temperatures, the vertical separation between the lowest and highest beds has been limited. Despite the use of fans to circulate air within the growing rooms, it has been difficult to move air currents across the beds in a uniform manner in a room crowded with beds which are relatively close together, creating large pockets of static air, and to maintain the air temperature differential within a narrow range for more than a small portion of the vertical height of the room. It has been found that limiting air temperature differentials exceeding about 2° C. adversely affect growth. In growing rooms, which are often twelve to fourteen feet high, there will often be a temperature differential of 6° C. between the floor and ceiling. This is one reason stationary bed growers only grow on trays or beds five or six tiers high. Even in this narrow range, the trays in the center will receive the optimum temperature and thus normally provide the greatest yield with the lowest and highest beds suffering the most. If a larger number of tiers were employed, the resulting larger temperature differential and lack of adequate air circulation would be inimical to effective growth in the additional trays.

The prior art systems are labor intensive. Watering is usually done by hand, and thus it is almost impossible to water each tray equally or evenly. Some types of mushrooms, such as the Volvariella variety, require exposure to a controlled amount of light; but this becomes more difficult as the number of trays in a given area is increased.

SUMMARY OF THE INVENTION

The present invention provides an improved plant cultivation system, apparatus and method which overcome the drawbacks of the prior art systems and which expose all growing beds to the same temperature, air circulation and moisture conditions.

In one aspect, the invention permits almost double the growing area per floor space by solving the air circulation problem. To this end, the invention contemplates the provision, in an environment in which air stagnation ordinarily limits the normal vertical separation between the top and bottom tiers to a limiting distance at which the ambient air temperature differential between the top and bottom tiers is smaller than a limiting temperature differential inimical to plant cultivation, of a plurality of tiers of plant cultivation beds, with the top and bottom tiers having a vertical separation which is greater than said limiting distance.

The tiers are moved about a generally vertical endless path at a speed rapid enough to cause air movement from paddling action of the tiers sufficient to maintain the ambient air temperature differential between the top and bottom tiers smaller than the limiting temperature differential despite the greater vertical separation between the top and bottom tiers. In particular, for the cultivation of edible mushrooms, the movement of the tiers is at a rate to maintain the air temperature differential at about 2° C. or less. The temperature variation of the beds themselves, however, is less than 1° C., because all beds are treated to the same temperature and humidity environment.

The tiers comprise spaced trays supported on endless conveying means. Each of the trays support baskets containing a plant growth medium. For mushroom varieties which do not require a casing layer, the baskets are formed of open mesh, allowing mushroom growth on the bottom and all sides of the basket.

Preferably, the conveying means comprises a pair of horizontally spaced, endless driven elements between which the trays are supported. In particular, the path of the trays lies in a vertical plane. With this arrangement, the column of trays may extend from the floor to the ceiling of the growing room and thus the ratio of growing area to floor area can be considerably increased over the known systems.

The endless elements may be trained around pulleys mounted on two spaced-apart hollow shafts, one of which may be connected to an air supply means for supplying air to the plants, and the other of which may be a drive shaft, having spaced thereabout extraction nozzles for extracting air, and including means for conveying the extracted air away from the trays. The quantity of fresh air in the system can therefore be closely controlled and the air speed across each tray, which in the case of mushrooms is in the neighborhood of 0.5 feet per second, can also be controlled.

It is particularly convenient if the apparatus includes means for supplying water to the growth medium from the vicinity of the endless path. The water may be sprayed as a mist into the path of the trays or baskets, the continual movement of the trays creating uniform exposure to the mist. It is useful if the water is preheated to a temperature just above that of the growth medium since this prevents the plants from being "shocked" as would happen if cold water were used, and this also helps to maintain the overall temperature in the growing room and also its evenness.

The temperature and humidity of the atmosphere in the growing room may be additionally controlled during the growing process by supplying steam to the growth medium from the vicinity of the endless path. If the temperature in the growing room drops, a small amount of steam may be injected to raise it again. The supply of steam is preferably also used, prior to the growth medium being put into the baskets, to sterilize the apparatus. Once the growth medium is in place, it can be pasteurized by raising the temperature to about 62° C. or higher for a varying length of time depending on the type of mushrooms being grown and the depth of the beds. Temperature control is aided if the growing room is well insulated.

The plant cultivation method according to the invention includes two main phases in a common housing: a pasteurization phase followed by a growing phase. This is accomplished by closely controlling the temperature and humidity conditions within the housing.

Uniform exposure to light, if required, is very simply arranged by having a single source adjacent to the apparatus and past which each bed oves at a uniform speed.

It is contemplated that a plurality of growth units according to the invention be contained within a common housing or mushroom growing room. These units are placed in rows which are closely spaced, and several units in each row are connected end-to-end to be driven by a common drive motor.

It will be appreciated that the apparatus of this invention is labor saving, the movement of the trays about the endless path saving an operator from having to move the baskets around for the pasteurization, planting, growing and harvesting processes.

Additional objects, advantages, and principles of the invention will become apparent from the following detailed description of a preferred embodiment of the invention when considered in conjunction with the accompanying drawings.

BRIEF DESCRIPTION OF THE DRAWINGS

FIG. 8 is a diagrammatic view of an air diffuser of the apparatus;

FIG. 9 is a diagrammatic view of an air extractor of the apparatus;

FIG. 10 is a diagrammatic view of a pair of water nozzles of the apparatus;

FIG. 11 shows two diagrammatic views of a steam pipe of the apparatus;

DETAILED DESCRIPTION OF THE PREFERRED EMBODIMENT

Figure 1:
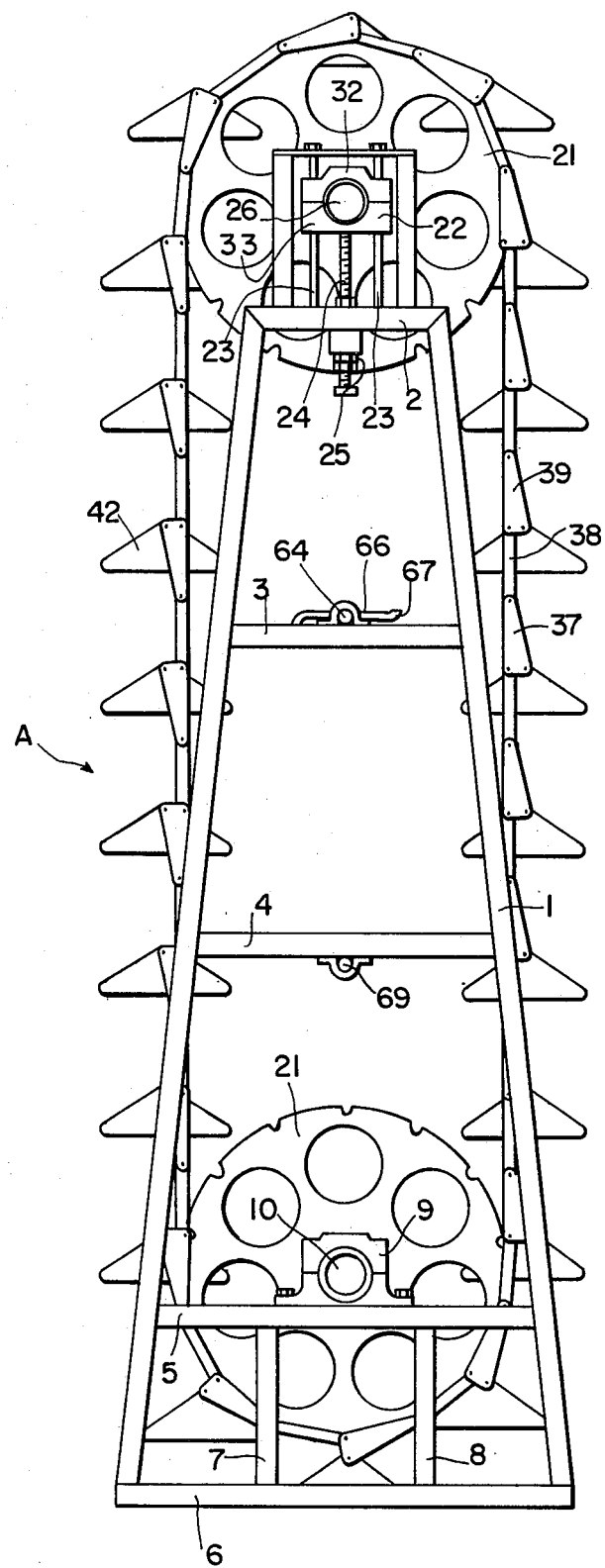
FIG. 1 is a side elevation of a growth unit of the invention.

A growth unit A of the invention comprises two A-frames 1 which may be made from mild steel and one of which is shown in FIG. 1. The frame has four equally spaced cross-struts 2, 3, 4 and 5 and a base strut 6 which may be welded or bolted to the frame 1. The cross struts 5, which are additionally supported by reinforcing posts 7 and 8, support a bearing block 9. A hollow drive shaft 10 is rotatably held at each end in respective bearing blocks 9.

Figure 2:
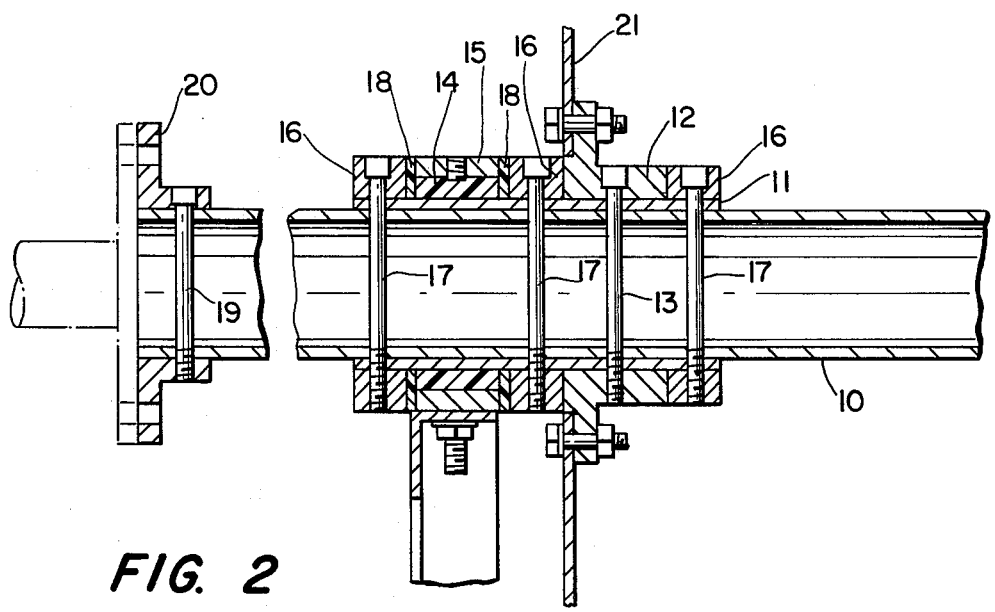
FIG. 2 is an axial section through a drive shaft bearing of the apparatus of FIG. 1.

The bearing arrangement is illustrated more clearly in FIG. 2. Each end of the drive shaft 10 is surrounded by a stainless-steel sleeve 11 upon which an annular flange element 12 is non-rotatably mounted, held by a pin 13. The drive shaft 10 is supported in the bearing block 9 by a bush 14 and an annular bracket 15. Three annular steel spacers 16 are non-rotatably connected to the drive shaft 10 by pins 17.

The pins 13 and 17 are designed to shear if there is a malfunction, and thus the major components of the apparatus are protected from damage. In use, the bearings may have to support a load of 2.34 tons which produces a pressure of 234 lbs. per square inch. Also, as the apparatus is likely to be used in an atmosphere with a temperature in excess of 60° C. (for reasons explained later), the bush 14 and washer 18 may be made of "Tuffnol" which is a hard carbon-fibre material having a low coefficient of expansion and the property that the bearing surface improves with use. Lubrication is not required for these bearings because the speed of rotation is slow.

One end of the drive shaft 10 may be non-rotatably connected by a pin 19 to a further annular flange 20 which may be connected to a drive motor (not shown) through a gear box.

Figure 3:
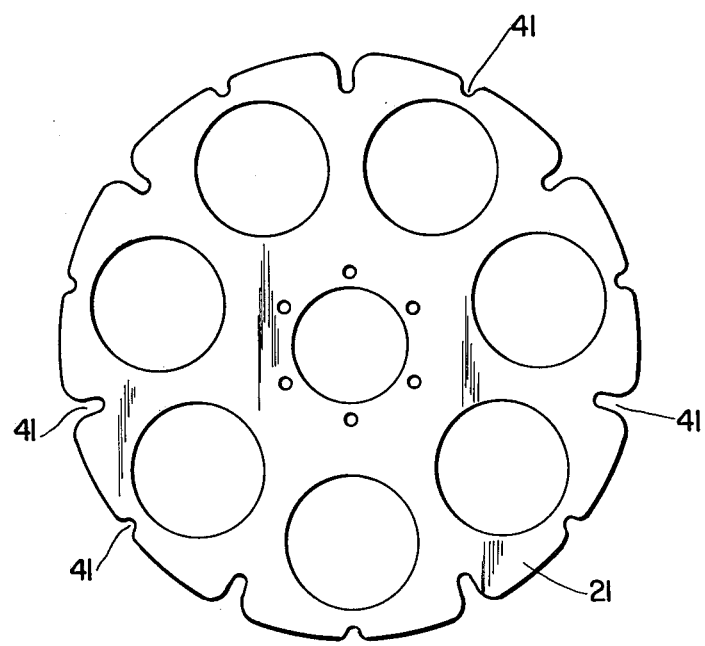
FIG. 3 is a side elevation view of a pulley wheel of the apparatus of FIG. 1.

Between the two frames 1, the drive shaft 10 carries, adjacent to its ends, a pair of pulleys 21. Each pulley 21 comprises a single plate which is attached to the annular flange element 12 as shown in FIG. 2. As may be seen from FIGS. 1 and 3, the pulley 21 has a plurality of equally spaced notches 41 spaced around its periphery.

Each cross-strut 2 supports a further bearing block 22 which is slidable on two rods 23 and can be fixed at any desired point along the rods 23 by means of an adjusting rod 24 connected to an adjusting nut 25. A top shaft 26, which is also hollow, is connected between the two bearing blocks 22.

Figure 4:
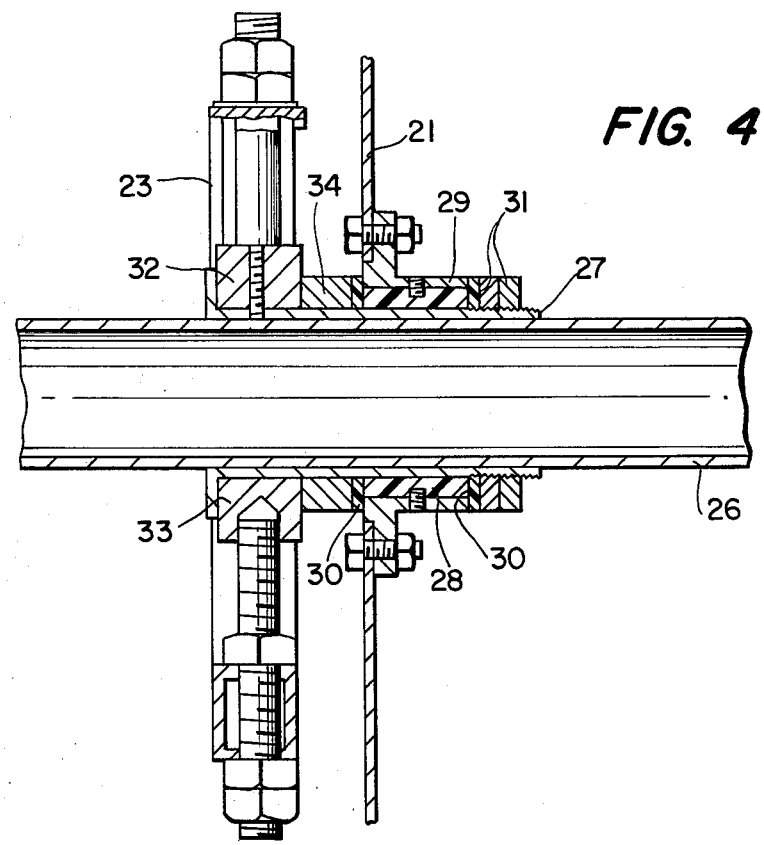
FIG. 4 is an axial section through an upper shaft bearing of the apparatus of FIG. 1.

The arrangement is very similar to that for the bottom shaft 10 except that the top shaft 26 is non-rotatable in the bearing block 22. This may be seen best in FIG. 4, which shows that a stainless steel sleeve 27 non-rotatably surrounds an end of the shaft 26. The sleeve 27 is rotatable in a bush 28, which is surrounded by an annular flange element 29. The bush 28 and the annular flange element 29 abut on each side a washer 30, one of which is held on the stainless steel sleeve 27 by two screw threaded locking rings 31. The top shaft 26 is supported between two brackets 32 and 33 of the bearing-block 22 which are spaced from the bush 28 by a spacer 34.

As with the lower bearing, it is preferable that the bush 28 and the washers 30 are made from "Tuffnol" and nylon.

The top shaft 26 carries, between the two frames 1, and at each end, a pulley 21. Each pulley 21 is secured to the flange element 29 and is thus rotatable on the sleeve 27 and hence on the shaft 26. The pulleys 21 on the top shaft 26 are identical with and aligned with the respective pulleys 21 on the bottom shaft 10. This may best be seen in FIG. 5.

Figure 5:
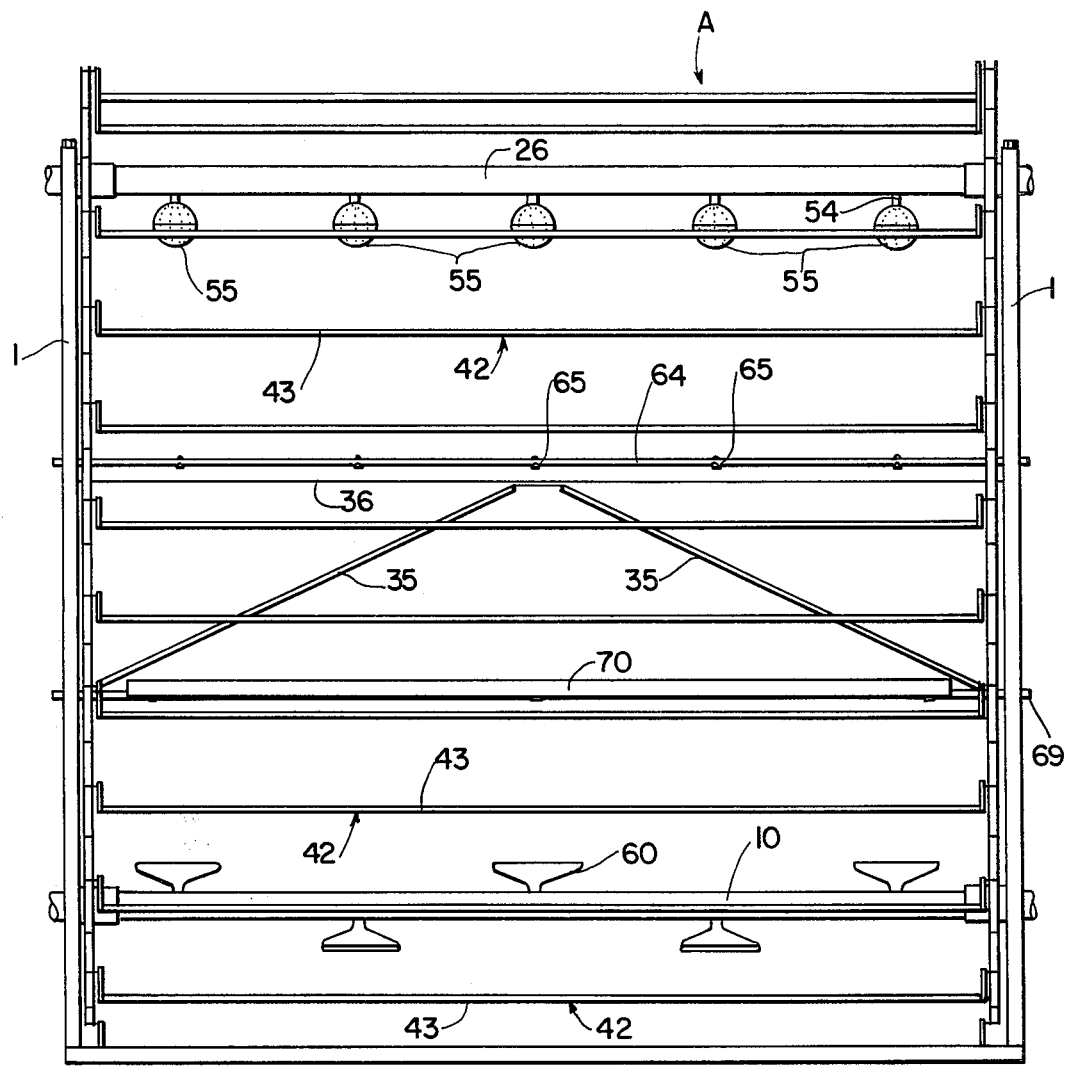
FIG. 5 is a front elevation of the apparatus.

The rigidity of the apparatus is increased by a V-shaped supporting bracket 35 extending from the cross strut 4 to a central connecting beam 36, as shown in FIG. 5.

Each pair of upper and lower pulleys 21 is connected by an endless belt 37. Each belt 37 is formed by a double chain of alternating steel links 38 and 39, the links 38 being straight and the links 39 generally triangular. As may be seen from FIGS. 6 and 7, the links 39 each support one of a plurality of trays 42, whilst the links 38 are merely spacing links. The links 38 and 39 have the foot of the triangle directed in the same direction outwardly of the path of movement. The link pins 40 engage in the notches 41 in each pulley 21. Each chain 37 is tensioned or loosened by adjusting the position of the bearing-block 22 with the adjusting nut 25 accordingly.

Figure 6:
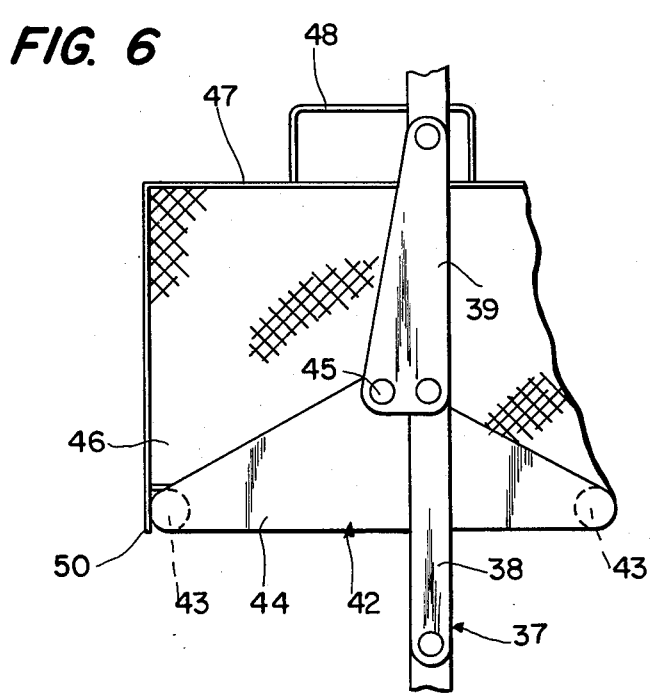
FIG. 6 is a partial side elevation of a tray and basket of the apparatus.

A plurality of trays 42 are suspended horizontally between the two chains 37 at equally spaced intervals along each chain. Each tray 42 has a rectangler base, the long sides of which are formed by a pair of stainless steel tubes 43 and the short sides of which are formed by a pair of triangular end plates 44 welded to the tubes 43, as may be seen in FIGS. 6 and 7. The end plates 44 are connected pivotally to the triangular links 39 by pins 45, as shown in FIG. 6, and the triangular shape of the links 39 provides additional clearance as the trays change direction at the top and bottom of their path.

Figure 7:
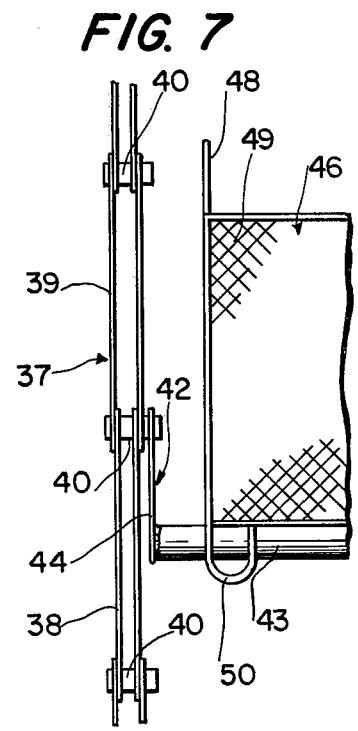
FIG. 7 is a partial front elevation of the tray and basket connected to an endless chain.
Figure 6A:
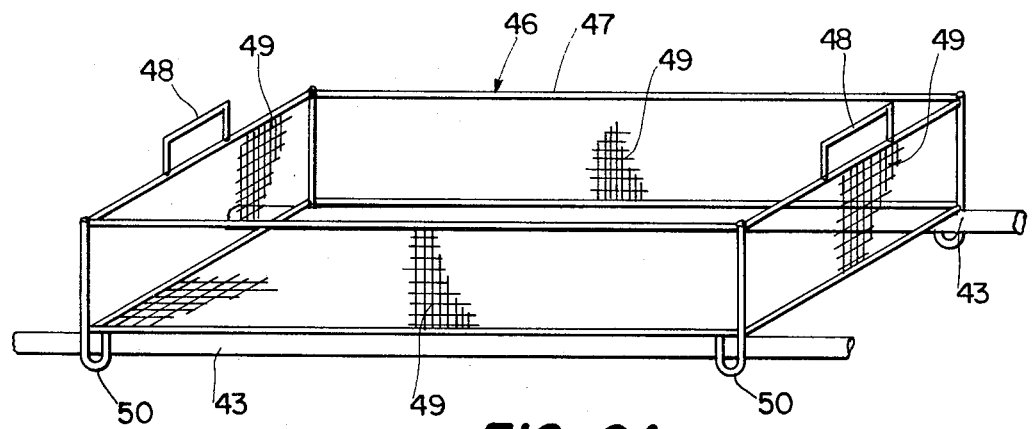
FIG. 6A is a perspective view of a basket of the apparatus.

The growth medium, such as compost, is placed in a number of baskets 46 which are then seated on respective trays 42. The baskets, which are typically about four inches deep for cultivation of the Volvariella mushroom, are formed by a number of rods 47 into the shape of a right-angled cage, the base of which has similar dimensions to the base of the tray 42. The short ends of the basket are provided with handles 48. Plastic or wire mesh 49 provides the sides and base of the basket 46 and is connected to the rods 47, as shown in FIGS. 6, 6A, and 7. Feet 50 depend from the corners of the basket and engage against sides of tubes 43 of tray 42 to prevent lateral shifting of the baskets. The baskets may use a mesh which has $\frac{3}{8}-\frac{1}{2}''$ holes. When these baskets are used for cultivating the Volvariella mushroom, mushrooms grow on all sides of the basket, including the bottom thereof. The baskets are labor saving, allowing for easy loading and emptying of the rooms. The baskets can be filled in the compost area and either conveyed in or moved in by trolley and placed quickly on the trays. With such trays, a machine with 200 square feet of growing space can be loaded in about eight minutes with the baskets themselves being packed with compost in a free area outside rather than inside a cramped growing room.

Figure 13:
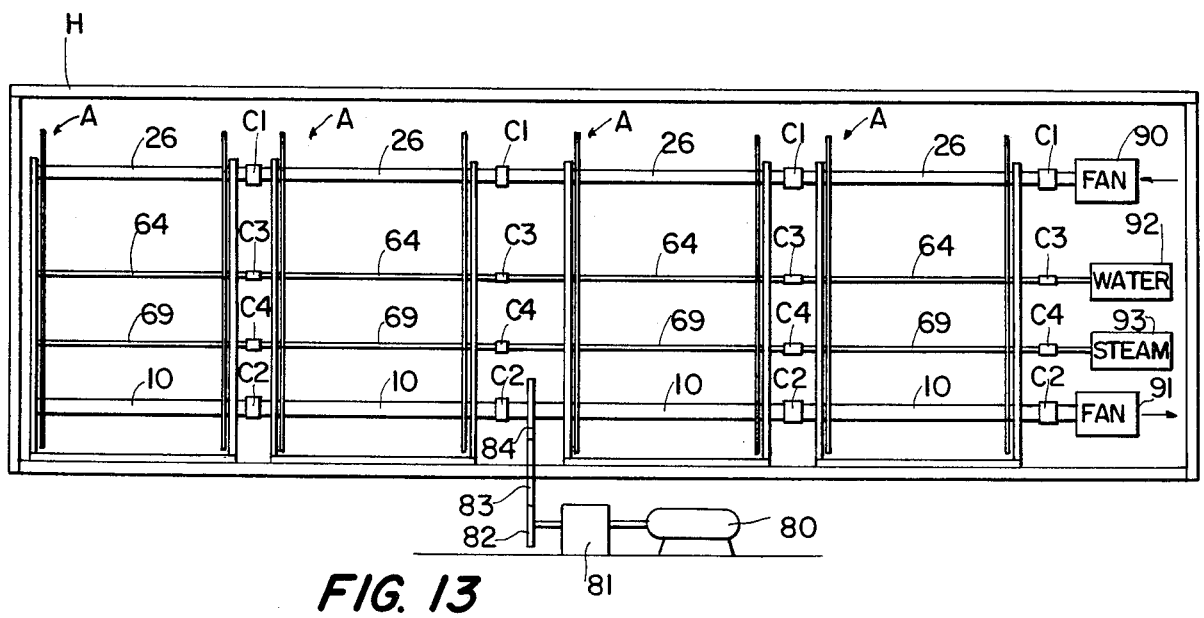
FIG. 13 is a schematic diagram of a front view of the system of FIG. 12.

The chains 37 are driven via the lower pulleys 21 by the drive shaft 10. As shown in FIG. 13, four growth units A may be connected in series by coupling their respective drive shafts 10 by means of hollow center flange couplings C2, the shafts and couplings being designed to withstand a maximum torque of two tons and a twist factor of 2°. The drive shafts 10 are driven by an electric motor 80, which preferably has a star delta starting configuration to relieve the initial high starting torque, through a 60-1 reduction gear box 81, a sprocket 82, a drive chain 83 and a sprocket 84 mounted on shaft 10 between the second and third units of the series, the sprockets providing a further ratio reduction of 15-1. Although FIG. 13 shows four growth units A driven by a common motor 80, in a commercial mode eight such units are driven by a single motor. In that case, a 20 hp motor is used. In general, 2.4 hp of motor power capacity is required for each unit being driven. It is important that the shaft 10 upon which sprocket 84 is mounted have a wall thickness twice that of the other three drive shafts; this is necessary in view of the very high initial torque load.

A typical rate of rotation for drive shaft 10 is three rpm at which there is a tray velocity of 0.8 feet per second or 48 feet per minute. For an A-frame height of twelve feet, this is slow enough for the baskets 46 to be placed on and removed from the respective trays 42 while the trays are moving. Moreover, the speed can be varied as requirements dictate down to a minimum of less than one rpm by changing the gear ratio. In any case, the speed must be rapid enough for the baskets on the trays to cause sufficient air movement through paddling action to maintain the air temperature differential between the top and bottom of the endless path traversed by the trays at about 2° C. This makes it possible to provide optimum growing conditions for all of the trays despite the use of a greater number of tiers than the limit of five or six in the prior art systems. At a twelve foot height, the minimum speed should be 1 rpm. Different plants or different types of mushrooms will prosper better at different speeds. For the Volvariella mushroom, a speed of 1 rpm is preferred.

In the example illustrated, there are twenty-two trays, forming in effect about eleven tiers, each tray having a base area of ten square feet, thus providing a total growing area of 220 square feet for a floor area which is about 36.5 square feet. The ratio of growing space to floor space is thus approximately six to one, as compared with prior art ratios between three and four to one. With increased height, the ratio would be increased.

In the cultivation of speciality food products, such as mushrooms, the environment in which they are grown is critical. In particular, they require clean, fresh air; high humidity; some light (depending on the strain); fresh water; and accurate temperature control varying from 100° C. to 10° C. In use, the apparatus of the present invention is set up in a closed growing room H. The atmospheric conditions within the room are controlled remotely, as will now be described.

The top shaft 26 of the apparatus is hollow and acts as an air supply pipe. As shown in FIGS. 5 and 8, shaft 26 is provided with five equally spaced outlets 54 opening towards the bottom shaft 10, each opening 54 being connected to a respective air diffuser 55. One diffuser 55 is illustrated in detail in FIG. 8. The diffuser 55 comprises a spherical plastic or PVC container and has a number of apertures 57 through which air can escape. The diffuser 55 is connected to the shaft 26 by an air duct 58 passing through the hole 54, the end of the air duct 58 inside the shaft 26 being shaped to face towards the incoming air. The air duct 58 is sealed in the hole 54 by a rubber seal 59.

Fresh, filtered air is blown into the shaft 26 by an axial flow fan 90 (see FIG. 13), passes through the air duct 58, and is dispersed to be emitted uniformly through the apertures 57. It has been shown that air speed across a mushroom tray should be in the neighborhood of 0.5 feet per second. This is achieved in this case by the movement of the trays through the band of fresh air around the upper shaft. Thus, the motion of each tray relative to the air creates an even flow of filtered fresh air across it, creating a uniform air distribution. The paddling action of the trays also spreads the fresh incoming air uniformly throughout the growing room.

The end of the shaft 26 remote from the air inlet is plugged, and the air flow can be damped or stopped by a butterfly or ball valve located in the air stream prior to the shaft 26.

The fan or fans are arranged to produce a minimum of two complete changes of air per hour but are capable of up to six air changes per hour.

The bottom shaft 10 is also hollow and is used to extract air from the lower region of the growing room. It will also extract carbon dioxide which is produced during cultivation and which, due to its greater density, sinks to the bottom of the room. The shaft 10 is provided with five vacuum cleaner type nozzles 60 made from GRP or fiberglass and spaced equally along the shaft, as may be seen in FIG. 5. One nozzle 60 is illustrated in more detail in FIG. 9 which shows that the nozzle has an integral extraction duct 61 passing through a hole 62 in the shaft 10 and opening towards an extraction fan 91 (see FIG. 13). The outlet duct 61 is sealed in the hole 62 with a rubber seal 63. The outlet end of the shaft 10 is connected to fan 91, which is a matched axial flow fan identical to fan 90 but with the direction of rotation reversed to create a suction. A butterfly or ball valve may also be provided to throttle the output stream.

A water pipe 64 is connected, between the two A-frames 1 to the cross struts 3 (see FIGS. 1 and 5), the pipe 64 having five pairs of atomizing nozzles 65 spaced at equal intervals along the pipe and with one nozzle of each pair pointing towards the top shaft 26 and the other of the pair pointing towards the bottom shaft 10. As may be seen from FIGS. 1 and 10, each one of a pair of nozzles 65 has an inlet duct 66 extending parallel to the cross strut 3 and an atomizer 67 attached to the duct 66. The ducts 66 are welded in holes 68 in the pipe 64 (see FIG. 10). Pipe 64 is connected to receive water from a water supply 92 (FIG. 13).

The water is preferably pre-heated in a pressure tank outside the growing room by using an immersion heater, and the temperature is controlled to be at about 2° C. above the growth medium temperature. The water emerges from the atomizers 65 as a fine mist which permeates the entire surface of each basket 46. Typically, the pressure at each nozzle is 100 lbs per square inch. Since the atomizing nozzles 65 point in two directions, both the top surface and the bottom surface of each basket are watered equally.

Some strains of mushrooms require a certain degree of light to stimulate growth and to control color. A uniform exposure to light is easily achieved by having one light source past which each of the trays passes in turn.

Temperature and moisture control is aided by injecting steam as required through a steam inlet pipe 69 attached, between the two A-frames 1, to the cross struts 4. The steam pipe 69 has along the majority of its length an umbrella section or baffle 70 (see FIG. 11). Steam emitted through apertures 69' in the top of pipe 69 first impinges on the baffle 70 so that steam is prevented from being directed on to the trays as they pass. The steam flows from a steam supply 93 (FIG. 13) at a pressure of up to 150 lbs per square inch and at a maximum temperature of 100° C.

Figure 12:
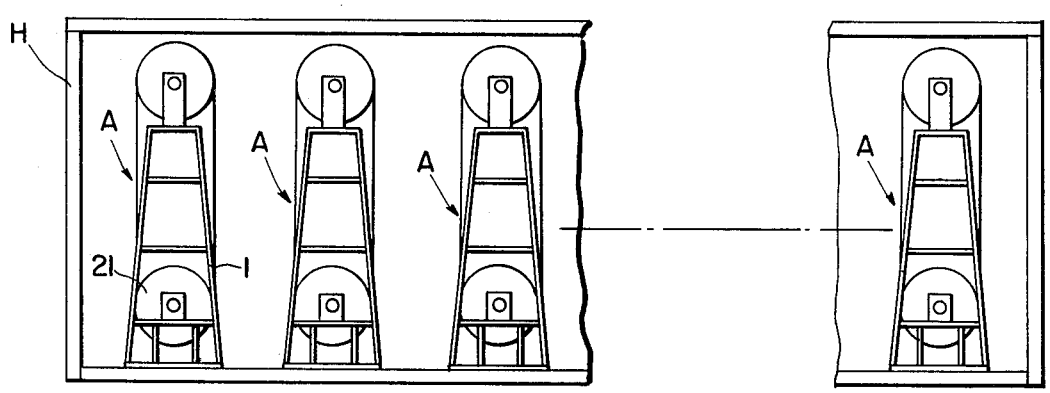
FIG. 12 is a schematic diagram of a side view of a system of the invention showing a plurality of growth units in a common housing.

As shown in FIG. 12, a number of rows of growth units A may be placed in parallel within the closed housing or growth room H. In order to make efficient use of the space within the housing, the units are closely spaced, allowing only sufficient room between them for servicing the units. Also, the units extend almost to the ceiling of the housing. As explained previously, this is made possible by virtue of the air movement created by the paddling action of the cultivation beds on trays 42 as they move along the endless path.

Several units are connected in series end-to-end as seen in FIG. 13. For this purpose, the shafts 26 of each unit are coupled by open center flange couplings C1, one of which also connects shafts 26 to inlet fan 90. In like manner, the shafts 10 of each unit are coupled with similar couplings C2, one of which connects shafts 10 to outlet fan 91. Water pipes 64 are joined by couplings C3, one of which connects the pipes to water supply 92. In the same way, couplings C4 connect steam pipes 69 to each other and to steam suppy 93. The ends of shafts 10 and 26 and pipes 64 and 69 opposite to the ends connected to the fans or water and steam supply are plugged.

One of the advantages of the present invention relates to the ability to conduct two main phases of the mushroom growing process, the pasteurization phase and the growing phase, in a common housing without the necessity of moving the growth medium, or a tray containing the growth medium, from one housing to another, as is the practice in prior art systems.

Prior to the start of a mushroom growing process, the temperature of the atmosphere within the growing room or housing is raised for a time in order to sterilize the apparatus. This temperature is achieved by injecting steam through the pipe 69. The growth medium can then be laid in the baskets, and the trays may be moved stepwise to bring successive trays to a level most convenient for loading baskets on the trays. In the first phase of the method, pasteurization is effected by raising the temperature again, this time to about 62° C. or higher for a varying length of time depending on the mushroom being grown and the depth of the bed. For the second phase of the method, the temperature of the atmosphere will then be gradually reduced to the appropriate temperatures for spawning and growing. For example, in the case of the Volvariella mushroom, a temperature of 34° C. is appropriate during the mycelium run stage, with the temperature being lowered to about 30° C. during the fruiting stage. On the other hand, the Agaricus mushroom requires a temperature of 16° C. Whatever temperature is required is accurately achieved for all growing trays within the growing room through the air movement caused by the paddling action of the trays. This temperature is maintained by periodically injecting steam into the housing to raise the temperature when required or by injecting cool fresh air through the upper shaft. During this phase of the method, the inlet and outlet fans 90 and 91 are operated to ventilate the housing, drive shaft 10 is driven to move the trays about the endless path to circulate the air and keep the temperature differential to about 2° C., and water is sprayed from nozzles 67 to keep the growth medium in the baskets moist and to maintain the proper humidity within the housing.

The system, apparatus and method of the invention contribute to a higher and more uniform yield, greater utilization of space, and conservation of labor in the growing of edible mushrooms, such as the Volvariella and Agaricus bisporus varieties. In addition, with the use of an artificial source of light, other plants requiring intensive care, such as hot house cuttings, seedlings, watercress, bean sprouts, and house plants, may be cultivated in the apparatus.

While a preferred embodiment of the invention has been shown and described, it should be understood that various substitutions, changes, and modifications may be made therein without departing from the spirit and scope of the invention which is defined in the appended claims. 9n

The invention claimed is:

1. A method of plant cultivation for increasing the bed area to floor area ratio of multi-tier plant cultivation apparatus in an environment in which air stagnation ordinarily limits the normal vertical separation between the top and bottom tiers to a limiting distance at which the ambient air temperature differential between the top and bottom tiers is smaller than a limiting temperature differential inimical to plant cultivation, comprising the steps of:

provlding a plurality of said tiers, with the top and bottom tiers having a vertical separation which is greater than said limiting distance; and moving said tiers about a generally vertical endless path at a speed rapid enough to cause air movement from paddling action of said tiers sufficient to improve air circulation and reduce the ambient air temperature differential between the top and bottom tiers below said limiting temperature differential despite the greater vertical separation between said top and bottom tiers.

2. The method as recited in claim 1, wherein the plants being cultivated are edible mushrooms.

3. The method as recited in claim 2, wherein said movement of said tiers is at a rate to reduce said ambient air temperature differential to about 2° C. or less.

4. The method as recited in claim 3, wherein the number of tiers provided within said normal vertical separation is no greater than six and the number of said provided plurality of tiers is greater than six.

5. The method as recited in claim 4, wherein said number of tiers is about double the number of tiers in the normal vertical separation and said vertical separation is about ten feet.

6. A method as recited in claim 2, further comprising the steps of drawing ventilating air into said environment adjacent the top of said endless path and withdrawing air and carbon dioxide gas from said environment adjacent the bottom of said endless path.

7. A method as recited in claim 1, wherein said environment includes a plurality of closely spaced growing units, each comprising said plurality of tiers.

8. A method of mushroom cultivation, comprising the steps of:

providing a closed housing;

moving a plurality of mushroom cultivation beds within the housing about a generally vertical path, said beds being moved rapidly enough to cause air movement from paddling action of said beds sufficient to improve air circulation and reduce the ambient temperature differential within the housing; and controlling the environment within the housing to provide two phases of operation: a pasteurization phase and a growing phase.

9. The method as recited in claim 8, wherein during said pasteurization phase steam is sprayed into said housing to raise the temperature thereof to a level sufficient to pasturize a growth medium in said beds.

10. The method as recited in claim 9, wherein during said growth phase water is sprayed on said beds.

11. The method as recited in claim 10, wherein during said growth phase air is drawn into said housing and air and carbon dioxide are withdrawn from said housing.

12. A system for cultivating plants, comprising:

a plurality of multi-tier growth units in an environment in which air stagnation ordinarily limits the vertical separation between the top and bottom tiers to a limiting distance at which the ambient air temperature differential between the top and bottom tiers is smaller than a limiting temperature differential inimical to plant cultivation, each of said multi-tier growth units including a plurality of tiers of plant cultivation beds having a vertical separation which is greater than said limiting distance; and conveying means moving said tiers about a generally vertical endless path at a speed rapid enough to cause air movement from paddling action of said tiers sufficient to improve air circulation and reduce the ambient air temperature differential between the top and bottom tiers below said limiting temperature differential despite the greater separation between said top and bottom tiers.

13. The system of claim 12, further comprising a housing for said plurality of multi-tier growth units, said growth units extending upwardly from the floor almost to the ceiling of said housing to maximize the growing space within the volume of said housing.

14. The system of claim 13, wherein said growth units are placed in closely spaced parallel rows with a plurality of said growth units in each row being connected end-to-end.

15. The system of claim 12, wherein the plants cultivated are mushrooms and said ambient air temperature differential is about 2° C. or less.

16. The system of claim 15, wherein the number of said tiers is normally no greater than six, the number of tiers in said multi-tier growth units being greater than six.

17. The system of claim 16, wherein said number of tiers in said growth units is about double the normal number of tiers.

18. The system of claim 12, wherein said growth units comprise trays and said plant cultivation beds comprise a growth medium contained in baskets supported on said trays.

19. The system of claim 18, including means for supplying water to the growth medium from the vicinity of the endless path.

20. The system of claim 18 or claim 19, including means for supplying steam to the vicinity of the endless path.

21. The system of claim 20, wherein the steam and/or water is sprayed as a mist into the path of the cultivation beds.

22. The system of claim 18, wherein the conveying means comprises a pair of horizontally spaced, endless, driven belts between which the trays are supported.

23. The system of claim 22, including two spaced-apart tubular shafts around which the belts travel, one of the shafts being connected to air supply means and being provided with air diffusers for supplying air to plants in said cultivation beds.

24. The system of claim 23, wherein the other of the shafts is a drive shaft for driving the endless belts and includes, spaced thereabout, extraction nozzles for extracting air, and including means for conveying the extracted air away from the beds.

25. The system of claim 12, including means for supplying air to said environment and means for withdrawing air and carbon dioxide from said environment.

26. Plant cultivation apparatus, comprising:
frame means for supporting a drive shaft and an idler shaft, said shafts being vertically spaced;
a pair of spaced drive pulleys mounted on the drive shaft;
a pair of spaced idler pulleys mounted on the driven shaft;
a pair of endless driven elements connected between respective drive and idler pulleys;
a plurality of tray means supported at a plurality of positions between said endless driven elements;
cultivation bed means mounted on each tray means for containing a plant growth medium; and
drive means to rotate said drive shaft to move said cultivation bed means about an endless path at a speed rapid enough to cause air movement from paddling action of said cultivation bed means sufficient to reduce the air temperature differential between the top and bottom of said endless path.

27. The apparatus of claim 26, wherein the shafts are adjustably supported one above the other.

28. The apparatus of claim 26, further comprising a water pipe extending transversely to the plane of the endless path, said pipe having a plurality of nozzles through which water sprays into the vicinity of the endless path.

29. The apparatus of claim 28, wherein said nozzles are atomizing nozzles arranged in pairs pointing in opposite directions substantially parallel to the plane of the endless path.

30. The apparatus of claim 26, including a steam supply pipe extending transversely to the plane of the endless path and having a plurality of apertures through which, in use, steam is injected into the vicinity of the endless path.

31. The apparatus of claim 30, wherein the pipe is partially surrounded along the majority of its length by a baffle member against which, in use, steam emitted from the apertures initially impinges.

32. The apparatus of claim 26, wherein said shafts are tubular, one of said shafts being connected to air supply means and being provided with air diffusers for supplying air to plants in said cultivation bed means.

33. The apparatus of claims 32, wherein the other of said shafts includes, at spaced points therealong, a plurality of extraction nozzles for extracting air, said other of said shafts being connected to means for conveying extracted air away from said bed means.

34. The apparatus of claim 33, wherein said one of said shafts is positioned above said other of said shafts.

35. The apparatus of claim 34, wherein said drive shaft is said other of said shafts.

36. The apparatus of claim 26, wherein each of the endless driven elements comprises a chain.

37. The apparatus of claim 36, wherein links of each chain are substantially triangular.

38. The apparatus of claim 26, wherein said cultivation bed means comprise open mesh baskets.

39. The apparatus of claim 26, wherein said tray means comprises rods extending between said endless driven elements.

40. The apparatus of claim 39, wherein said rods are supported on tray plates pivotally attached to said endless driven elements.

41. The apparatus of claim 39, wherein said cultivation bed means comprise open mesh baskets resting on said rods, said baskets having depending feet adjacent said rods to hold said baskets in place.

42. Apparatus for cultivating plants, comprising:
a multi-tier growth unit in an environment in which air stagnation ordinarily limits the vertical separation between the top and bottom tiers to a limiting distance at which the ambient air temperature differential between the top and bottom tiers is smaller than a limiting temperature differential inimical to plant cultivation, said multi-tier growth unit including a plurality of tiers of plant cultivation beds having a vertical separation which is greater than said limting distance; and conveying means moving said tiers about a generally vertical endless path at a speed rapid enough to cause air movement from paddling action of said tiers sufficient to improve air circulation and reduce the ambient air temperature differential between the top and bottom tiers below said limiting temperature differential despite the greater separation between said top and bottom tiers.

43. The apparatus of claim 42, further comprising a housing for said multi-tier growth unit, said growth unit extending upwardly from the floor almost to the ceiling of said housing to maximize the growing space within the volume of said housing.

44. The apparatus of claim 42, wherein the plants cultivated are mushrooms and said ambient air temperature differential is about 2° C. or less.

45. The apparatus of claim 44, wherein the number of said tiers is normally no greater than six, the number of tiers in said multi-tier growth units being greater than six.

46. The apparatus of claim 44, wherein said number of tiers in said growth units is about double the normal number of tiers.

47. The apparatus of claim 42, wherein said growth units comprise trays and said plant cultivation beds comprise a growth medium contained in baskets supported on said trays.

48. The apparatus of claim 47, including means for spraying water on the growth medium from the vicinity of the endless path.

49. The apparatus of claim 47, including means for supplying steam to the vicinity of the endless path.

50. The apparatus of claim 47, wherein the conveying means comprises a pair of horizontally spaced, endless, driven belts between which the trays are supported.

51. The apparatus of claim 47, including means for supplying air to said environment and means for withdrawing air and carbon dioxide from said environment.

* * * * *